(12) United States Patent
Gagnon

(10) Patent No.: US 10,882,447 B2
(45) Date of Patent: Jan. 5, 2021

(54) MONITORING SYSTEM AND METHOD FOR A VEHICLE WITH A DUMP BODY

(71) Applicant: CLERAL INC., Val-d'Or (CA)

(72) Inventor: Allen Joseph Marc Gagnon, Val-d'Or (CA)

(73) Assignee: Cleral Inc., Quebec (CA)

( * ) Notice: Subject to any disclaimer, the term of this patent is extended or adjusted under 35 U.S.C. 154(b) by 0 days.

(21) Appl. No.: 16/348,200

(22) PCT Filed: Dec. 13, 2017

(86) PCT No.: PCT/CA2017/000266
§ 371 (c)(1),
(2) Date: May 8, 2019

(87) PCT Pub. No.: WO2018/107264
PCT Pub. Date: Jun. 21, 2018

(65) Prior Publication Data
US 2019/0322214 A1     Oct. 24, 2019

Related U.S. Application Data

(60) Provisional application No. 62/433,717, filed on Dec. 13, 2016.

(51) Int. Cl.
*B60Q 1/00*     (2006.01)
*B60Q 9/00*     (2006.01)
*B60P 1/04*     (2006.01)

(52) U.S. Cl.
CPC . *B60Q 9/00* (2013.01); *B60P 1/04* (2013.01)

(58) Field of Classification Search
CPC .... B60Q 9/00; B60P 1/04; B60P 1/26; B60W 40/12; B60W 40/10; B60K 28/10
USPC .......................................................... 340/457
See application file for complete search history.

(56) References Cited

U.S. PATENT DOCUMENTS

| | | | | |
|---|---|---|---|---|
| 3,789,357 A | * | 1/1974 | Fritz, Jr. ................. | B60P 1/283 180/286 |
| 2008/0201994 A1 | * | 8/2008 | Crago ....................... | E01H 5/06 37/197 |
| 2012/0123646 A1 | * | 5/2012 | Mantini ............... | B60G 17/019 701/48 |

* cited by examiner

*Primary Examiner* — Tanmay K Shah
(74) *Attorney, Agent, or Firm* — David Schnurr (57) ABSTRACT

A monitoring system and method for a vehicle with a dump body has at least four sensors on the vehicle one to monitor the position of the dump body relative to a discharge end, one to monitor the position of a gate at the discharge end, one to monitor gate locks, and one to monitor a speed and direction of the vehicle. The sensors are arranged to provide an output signal to a display which includes a programmable controller and software to provide a warning signal to the display for any unsafe conditions.

15 Claims, 6 Drawing Sheets

MONITORING SYSTEM AND METHOD FOR A VEHICLE WITH A DUMP BODY

BACKGROUND

Field of the Invention

This invention relates to a monitoring system and method for a vehicle with a dump body. The monitoring system providing a warning to an operator when the vehicle is being operated in an unsafe manner.

Background of the Invention

In a previous system, when a switch detects that the box has been lifted, the system sends an alarm. The alarm will sound in regular operating conditions which annoys and desensitizes the operator. Some operators have been known to shut off the system previously. When the system has been shut off, some operators forget to reactivate the system and when a dangerous situation arises, no warning or alarm is issued.

SUMMARY OF THE INVENTION

A monitoring system for a vehicle has a dump body thereon. The system comprises at least four sensors mounted on the vehicle, the dump body having a discharge end. A first sensor is located to monitor a position of the dump body between a maximum up position and a down position relative to the discharge end. The discharge end has a gate located therein with a second sensor located to monitor a position of the gate between a closed position and an open position. The gate has at least two gate locks with a third sensor located to monitor the gate locks between a locked position and an unlocked position. The vehicle has wheels thereon and at least a fourth sensor located on one of the wheels to monitor a speed and direction of the vehicle. All of the sensors are arranged to provide an output signal to a display and the display is controlled by a programmable controller and software to provide a warning signal to an operator whenever any of the position of the dump body or the gate, locks, speed and/or direction are unsafe or breached.

A method of operating a monitoring system for a vehicle has a dump body thereon. The system comprises at least four sensors mounted on the vehicle, the dump body having a discharge end a gate located in the discharge end to close off the discharge end when the gate is closed, and at least two gate locks, the vehicle having wheels. The system further comprises at least four sensors mounted on the vehicle, the dump body having a discharge end, a gate located in the discharge end to close off the discharge end when the gate is closed, and at least two gate locks, the vehicle having wheels. The method comprises installing a first sensor located to monitor a position of the dump body between a maximum up position and a down position relative to the discharge end, a second sensor located to monitor a position of the gate between a closed position and an open position, a third sensor located to monitor the gate locks between a locked position and an unlocked position, and at least a fourth sensor being located on one of the wheels to monitor a speed and direction of the vehicle, arranging all of these sensors to provide an output signal to a display and controlling the display by software to provide a warning signal to an operator whenever any position of the dump body, gate, locks, speed and/or direction are unsafe or breached.

DETAILED DESCRIPTION OF A PREFERRED EMBODIMENT

Figure 1:
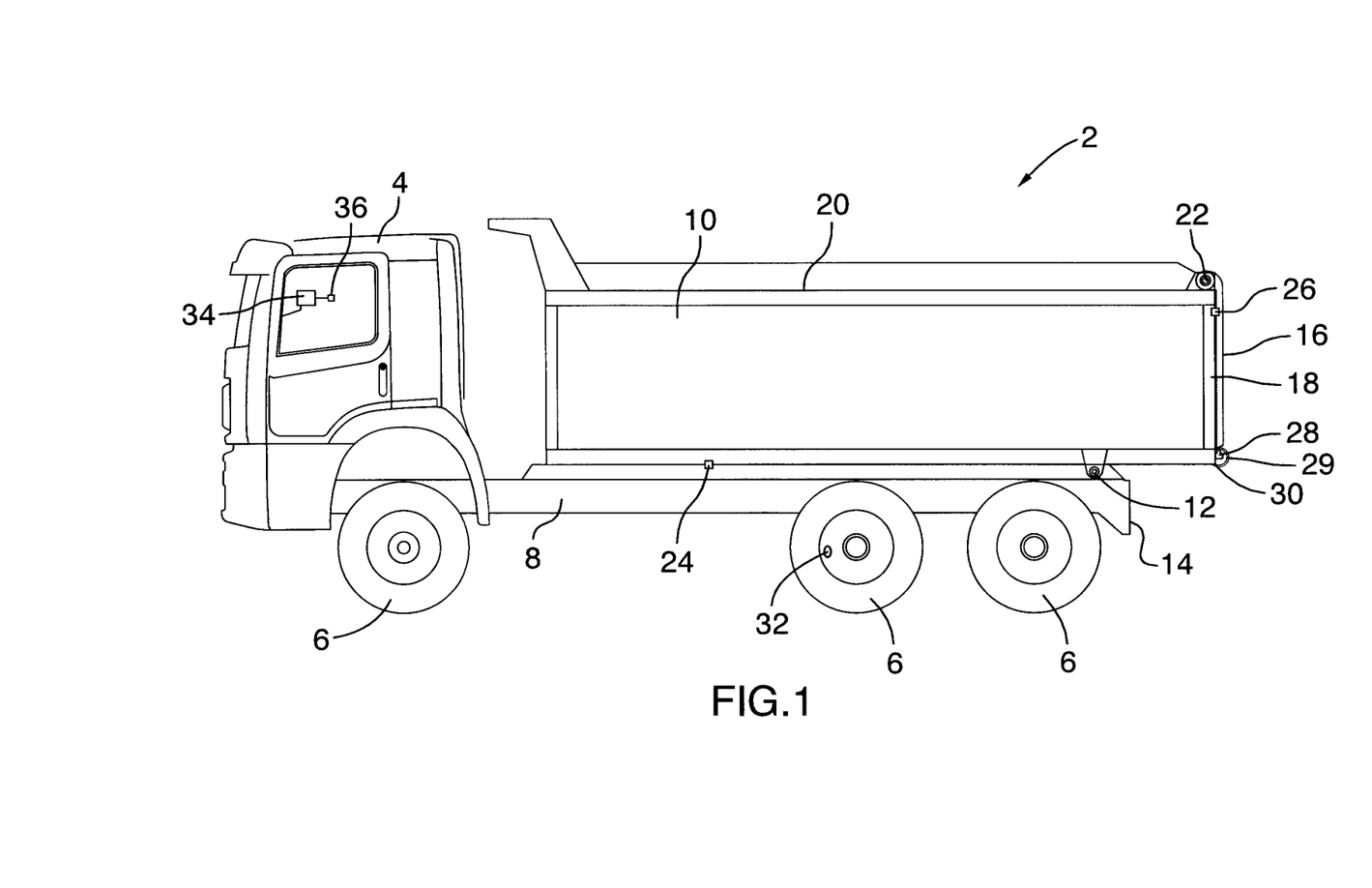
FIG. 1 is a side view of a vehicle having a dump body thereon where the dump body is in a down position.

In FIG. 1, a vehicle 2 has a cab 4 with wheels 6 and a frame 8 supporting a dump body 10. The dump body is pivotally mounted on the frame 8 about a pivot axis 12. The pivot axis 12 is located near a rear 14 of the frame 8. A gate 16 is located at a discharge end 18 of the dump body 10. The gate 16 is pivoted at or near a top 20 of the dump body 10, about a pivot axis 22. The gate 16 is shown in a closed position. When the gate 16 is closed, it closes off the discharge end of the dump body 10.

The dump body 10 is shown in a down position relative to the discharge end 18 and the dump body is substantially parallel to the frame 8. A first sensor 24 is located on the dump body 10 to monitor a position of the dump body between a maximum up position (see FIG. 2) and the down position relative to the discharge end 18 shown in FIG. 1. A second sensor 26 is located to monitor a position of the gate between a fully closed position as shown in FIG. 1 and an open position (see FIG. 2). The gate 16 has at least two gate locks 28 (only one of which is shown in FIG. 1) to lock the gate when the gate is in the closed position. A third sensor 30 is located to monitor the gate locks 28 between a locked position and an unlocked position. A fourth sensor 32 is located on one of the wheels 6 to monitor a speed and direction of the vehicle 2. The direction being monitored determines whether the vehicle is moving forward or in reverse. Each of the four sensors described can be more than one sensor. For example, the third sensor 30 is preferably a sensor on each of the locks 28. Similarly, the fourth sensor 32 can be more than one sensor. For example, the vehicle 2 may have an ABS sensor tone ring (not shown in FIG. 1) mounted on one of the wheels by the manufacturer of the vehicle, which can be used to monitor the speed of the vehicle, and another sensor may be required to be added in order to determine the direction of the vehicle. Also, the first and second sensors 24, 26, which are preferably proximity sensors, may each be more than one sensor. All of the at least four sensors are arranged to provide an output signal to a display 34 located in the cab 4 and visible to the operator (not shown). The display 34 is preferably a monitor and preferably has a speaker 36 so that both a visual and audio warning signal is produced when the vehicle is operated in an unsafe manner as described herein. The monitoring system is controlled by a computer. Preferably, the computer is a programmable controller. Preferably, the computer is located with the display or the display 34 in the cab 4 includes a programmable controller having a computer.

Figure 2:
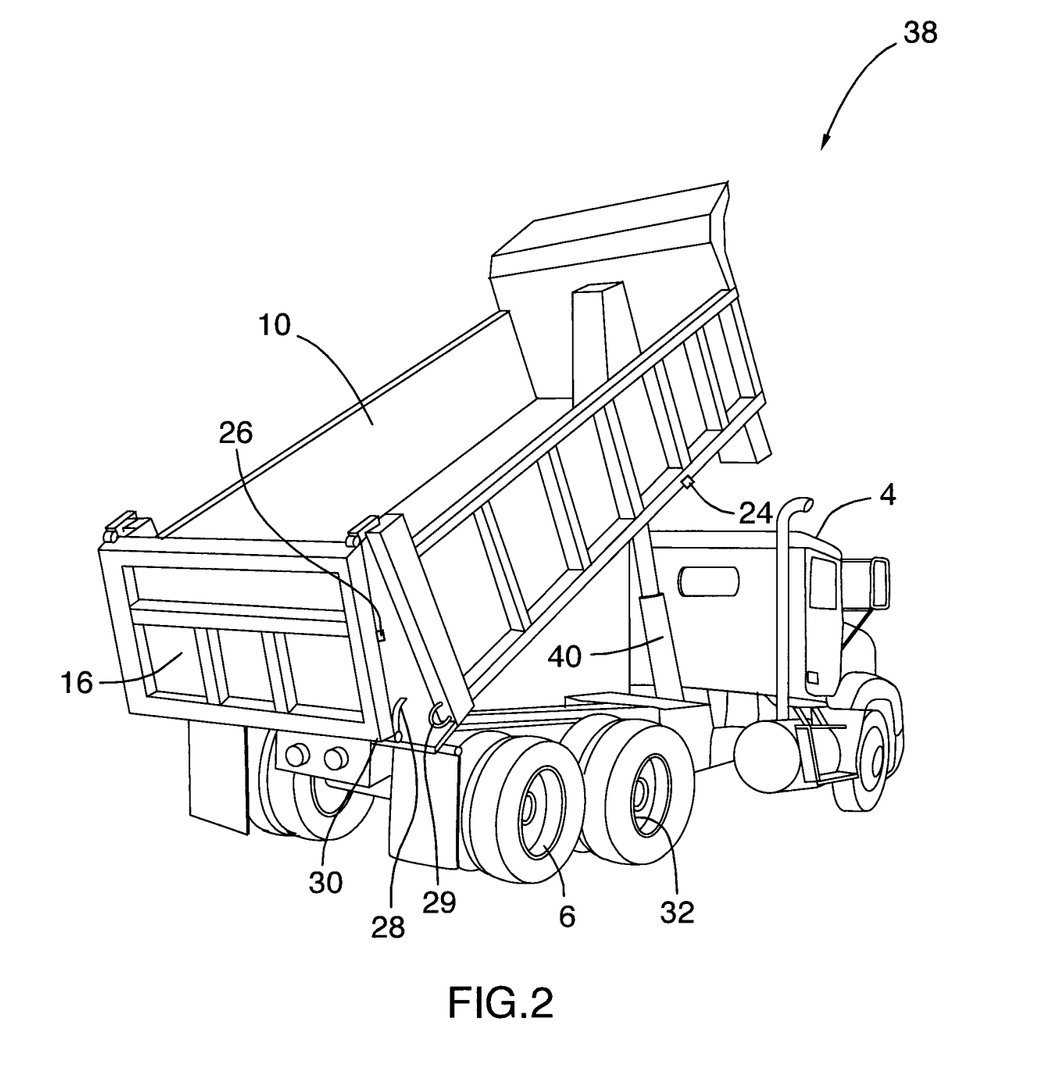
FIG. 2 is a perspective view of a vehicle having a dump body thereon where the dump body is in a maximum up position.

In FIG. 2, a vehicle 38 has a dump body 10 which is in a maximum up position. The gate 16 is open and the gate locks 28 extend into gate loops 29 (only one of which is shown in FIG. 2) located at a lower edge of the dump body 10. The gate locks 28 extend through the loops 29 in order to lock the gate 16 in the closed position as shown in FIG. 1. The dump body 10 in FIG. 2 is raised to an up position and can be lowered to the down position by an hydraulic cylinder 40. The same reference numerals are used in FIG. 2 for those components that are identical or similar to the components of FIG. 1. The display and computer are preferably located within the cab 4, but are not shown in the drawings.

Figure 3:
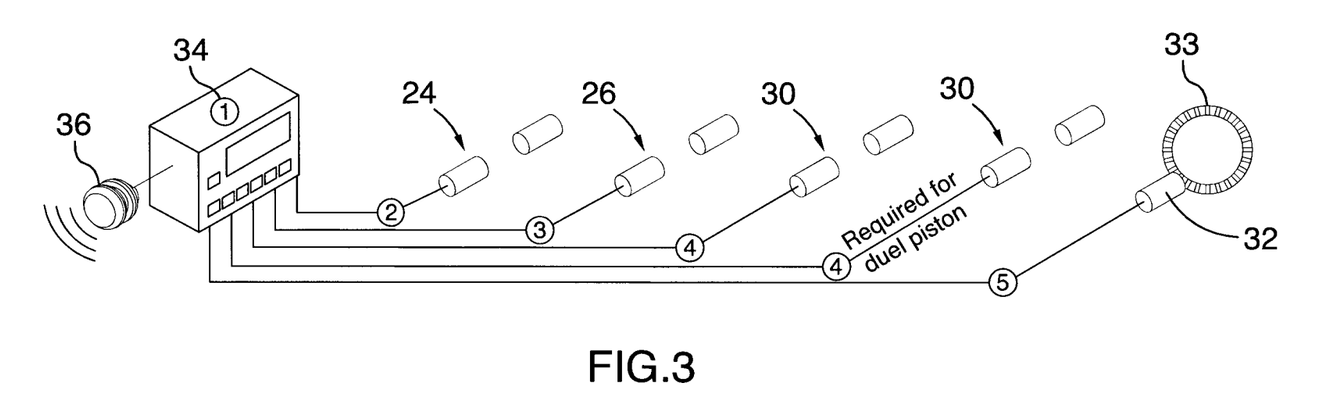
FIG. 3 is a schematic circuit diagram of a mechanically driven monitoring system of the present invention.

In FIG. 3, a schematic circuit diagram shows the display 34 with a speaker 36, the first sensor 24, the second sensor 26, the third sensor 30 and the fourth sensor 32. The fourth sensor has a tone ring 33, which can be used to monitor the velocity or speed of the vehicle. There are two sensors 30 shown in FIG. 3. If the locks 28 (not shown in FIG. 3) have dual pistons, then two sensors 30 are required to monitor each of the locks. The circuit diagram shown in FIG. 3 is for a mechanically driven locks.

Figure 4:
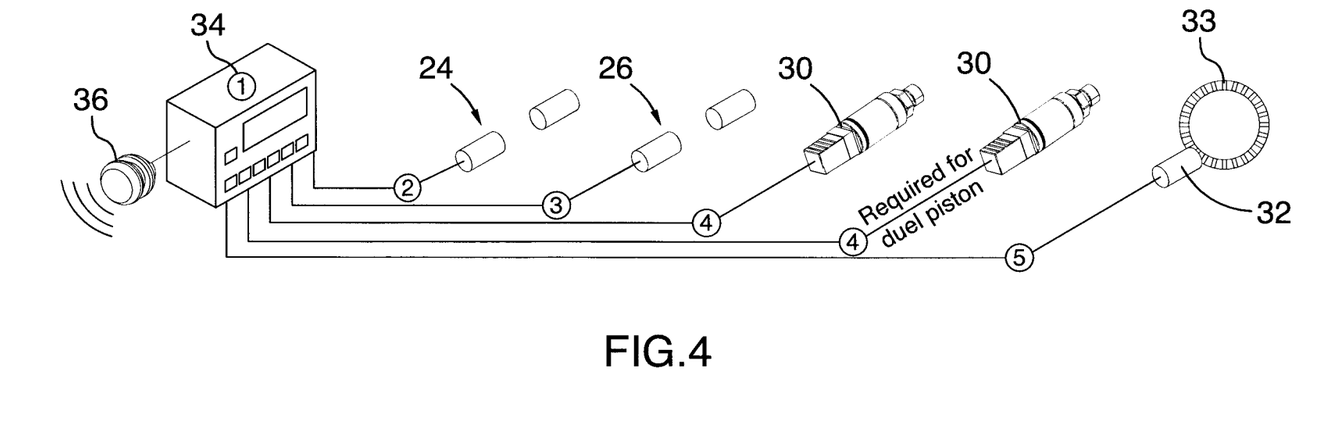
FIG. 4 is a schematic circuit diagram of a monitoring system of a present invention that is hydraulically driven or pneumatically driven.

In FIG. 4, a schematic circuit diagram is for hydraulically or pneumatically driven locks 28. There are two, third sensors 30 shown in FIG. 4 depending on whether the locks 28 (not shown in FIG. 4) have one piston or two pistons as described with respect to FIG. 3. The reference numerals in FIG. 4 are identical to the reference numerals in FIG. 3.

The programmable controller or computer located in the display, not only controls the operation of the sensors and issuance/non-issuance of warning signals and alarms, but it allows adjustable parameters or pre-set conditions to be programmed into the system. Time (eg. elapsed time, time delay), Speed and Distance are programmable and can be adjusted or changed for specific applications.

Figure 5:
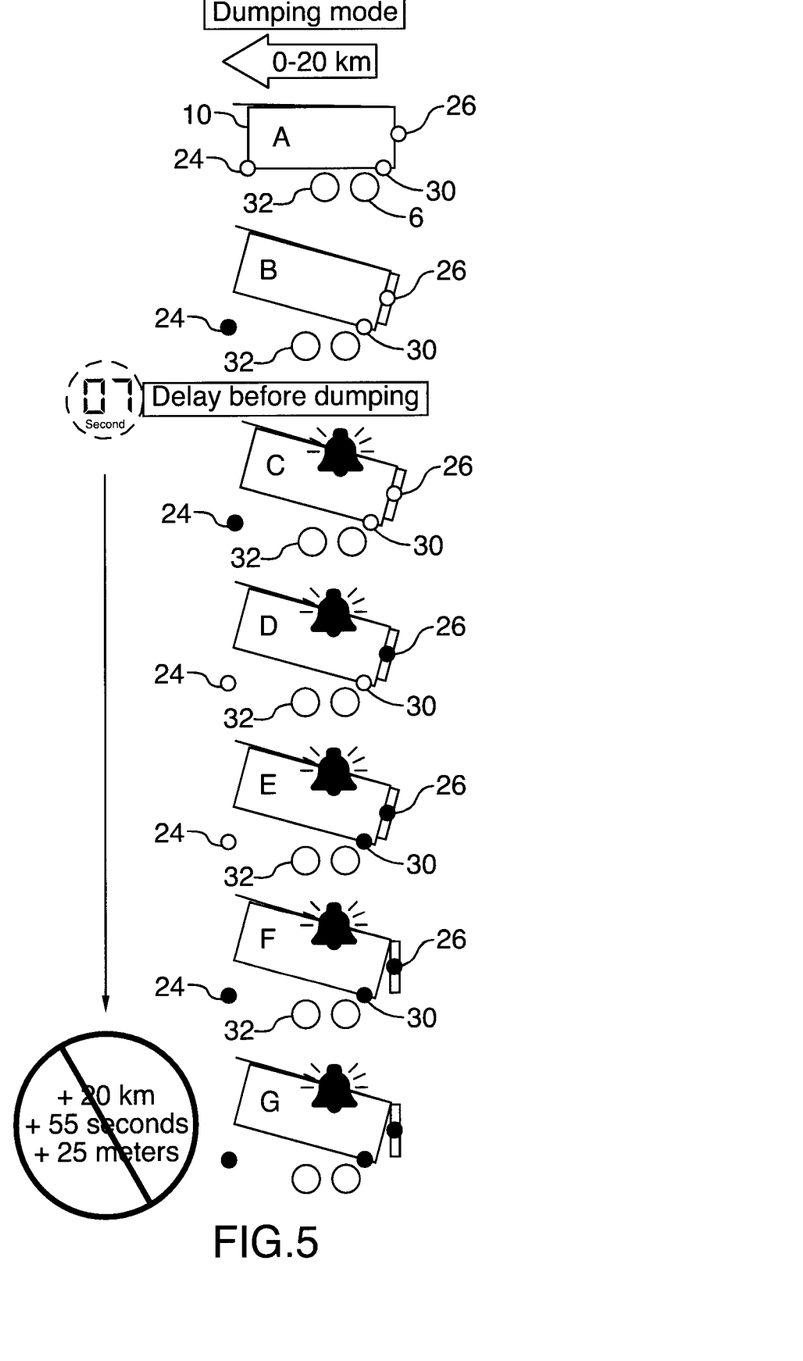
FIG. 5 shows a series of schematic side views of a vehicle having a dump body with at least four sensors thereon, where the vehicle is operated in a dumping mode.

In FIG. 5, there are a series of schematic side views (labelled "A" to "G") of the vehicle 2 when the vehicle is used in a Dumping Mode. The vehicle has four sensors, 24, 26, 30, 32 thereon. The speed of the vehicle in the Dumping Mode is 0 to 20 kilometres/hour. In FIG. 5A, the dump body is down and none of the sensors show an unsafe condition and no warning signal is produced. In FIG. 5B, the dump body is in an up position, but the gate is closed and locked and sensor 24 shows an unsafe condition. However, there is no warning signal as there is a seven second delay before actually dumping. In FIG. 5C, the seven second delay has expired and the warning signal is issued to the display and speaker because the dump body is up, but the gate is still locked and closed. In FIG. 5D, the gate is still closed, but the gate locks are unlocked so the warning signal is issued. In FIG. 5E, the gate locks are still locked and the gate is still closed and the alarm continues. In FIG. 5F, there is an alarm and warning signal because the gate locks are unlocked, the gate is open and the dump body is up but the dump body is empty. In FIG. 5G, pre-set Dumping Mode parameters have been exceeded. For example, if the speed has exceeded 20 kilometres or the time has exceeded 55 seconds or the distance has exceeded 25 metres, the alarm still sounds and the warning signal is still given.

Figure 6:
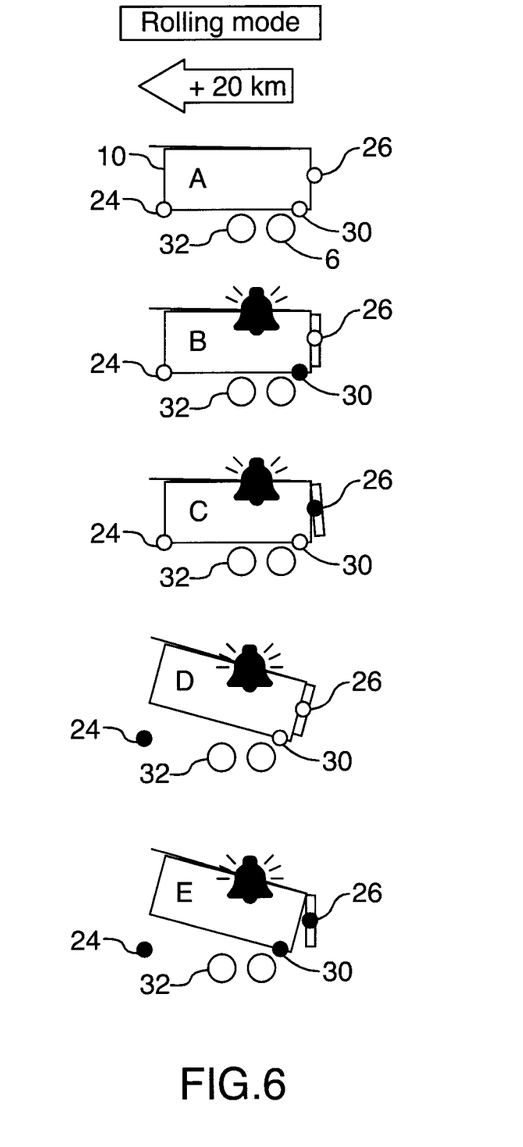
FIG. 6 shows a series of schematic side views of a vehicle with a dump body and at least four sensors thereon, where the vehicle is operated in a rolling mode.

In FIG. 6, there is shown a series of schematic side views (labelled "A" to "E") of the vehicle in a Rolling Mode where the speed is greater than 20 kilometres per hour. In FIG. 6A, no warning signal is provided because the dump body is down, the gate is closed and the gate locks are locked. In FIG. 6B, the dump body is down, the gate is closed, but the gate locks or at least one of the gate locks is unlocked, resulting in a warning signal being issued. In FIG. 6C, the dump body is down, the gate locks are locked, but the gate is open so a warning signal is issued. In FIG. 6D, the gate locks are locked and the gate is closed but the dump body is in the up position, so a warning signal is issued. In FIG. 6E, the dump box is up, the gate locks are unlocked and the gate is open, resulting in a warning signal being issued.

Figure 7:
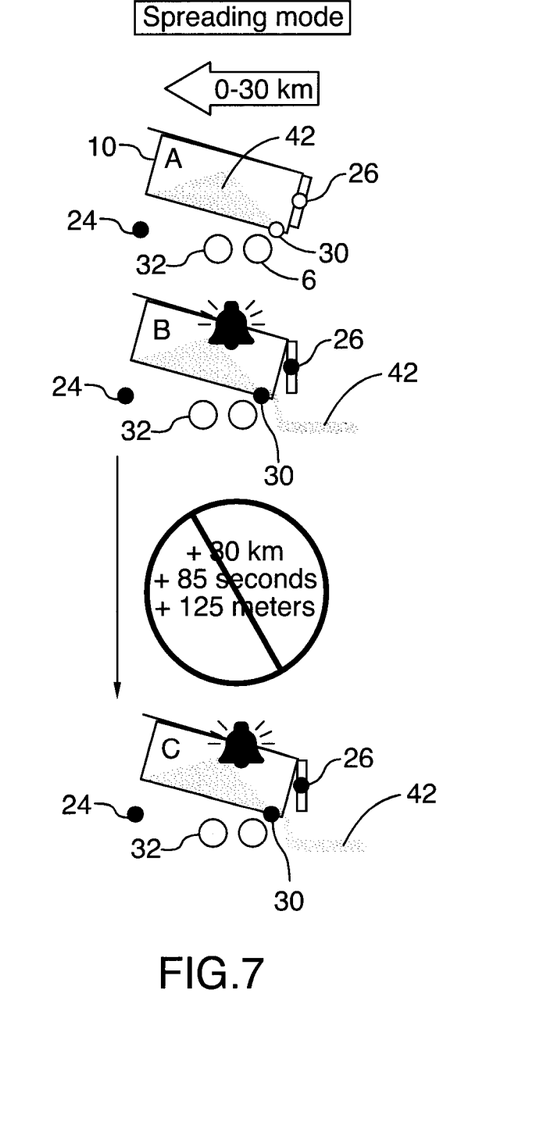
FIG. 7 shows a series of schematic side views of a vehicle with a dump body and at least four sensors where the vehicle is operated in a spreading mode.

In FIG. 7, there are a series of schematic side views (labelled "A" to "C") of the vehicle when the vehicle is being used in a Spreading Mode at a speed of 0 to 30 kilometres per hour. In FIG. 7A, the dump body is up, the gate locks are unlocked, but the gate is still closed. There is no warning signal issued because the vehicle has not yet moved and spreading of material 42 has not begun.

In FIG. 7B, the dump body is up, the gate locks are unlocked and the gate is open and spreading of material 42 from the dump box has begun. The vehicle is being operated under safe conditions within the proper speed and no warning signal is issued.

In FIG. 7C, a warning signal has been issued because the speed is greater than 30 kilometres per hour or the time lapse for the spreading is greater than 25 seconds that had been inputted or the distance travelled is greater than 125 metres and a warning signal is issued even though the box is up, the locks are unlocked and the gate is open and spreading of the material 42 is still continuing. When any or all of these parameters are exceeded the warning signal will be issued and the alarm will sound.

In each of these modes, the monitoring system can be adjusted. Each mode can be set beforehand with parameters or pre-set conditions, for example, for velocity, time before unloading, time after unloading and total distance. When any of these parameters or pre-set conditions are breached, a warning signal will be issued and the alarm will sound.

With the monitoring system of the present invention, there are four safety features that are monitored on the vehicle simultaneously. These are the raised or lowered position of the dump body or box, the closed or open position of the gate, the locked or unlocked position of the gate locks (or gate loops) and the direction and speed of the vehicle. The operator of the vehicle is alerted in several dangerous situations, without always being alerted as soon as the box is lifted. The monitoring system allows spreading applications without a warning signal being issued and without an alarm sounding. The monitoring system of the present invention can be configured so that an operator can silence the alarm in order to spread without the alarm, but the alarm will still sound if any of the pre-set conditions of speed, distance or elapsed time are breached. If any of the pre-set conditions are not met, the warning signal will be issued even if the alarm has been silenced. This reduces the risk of an operator forgetting to reinitiate the alarm.

In FIGS. 5, 6 and 7, the sensor or sensors that cause the warning signal to issue and the alarm to sound are shown as solid black circles. When a sensor or sensors do not cause a warning signal to issue or an alarm to sound the intension of the circle for those sensors is white.

The low speed range and high speed range can be adjusted within limits. For example, instead of having a low speed range being 0 to 20 kilometres per hour, the low speed range could be 0 to 25 kilometres per hour with a high range of speed being above the low range or the low speed range could be adjusted to 0 to 15 kilometers per hour.

Preferably, the monitoring system of the present invention cannot be turned off or shut down as long as the vehicle is operating.

EXAMPLE 1

Low range of speed 1 to 24 kilometres per hour, high range of speed greater than 24 kilometres per hour.

| Speed | Dump Body | Gate | Gate Lock | Warning Signal (alarm) |
|---|---|---|---|---|
| 0 | Up | Open | Unlocked | No |
| 0 | Down | Open | Locked | Yes |
| 0 | Up | Closed | Locked | Yes |
| 0 | Up | Closed | Unlocked | Yes |
| 1-24 km/h | Up | Open | Unlocked | No, unless one or more of the parameters (Speed, Distance, Time) are breached |
| 1-24 km/h | Down | Open | Locked | Yes |
| 1-24 km/h | Up | Closed | Locked | Yes |
| 1-24 km/h | Up | Closed | Unlocked | Yes |
| 25 km/h+ | Up | Open | Unlocked | Yes |
| 25 km/h+ | Down | Open | Locked | Yes |
| 25 km/h+ | Up | Closed | Locked | Yes |
| 25 km/h+ | Up | Closed | Unlocked | Yes |
| 25 km/h+ | Down | Closed | Unlocked | Yes |

With the system of the present invention, the gate locks or gate loops must be opened when the box is lifted or the gate is to be opened. Otherwise, an alarm sounds and visual messages are displayed regardless of the spreading conditions or velocity conditions existing. If it is desired to have a dump body that only unlocks the loops or gate locks when the box has been lifted to a certain height, the system of the present invention has a delay so that the warning signal and alarm will not be triggered until the particular height has been exceeded.

After the dump body is lowered, the gate must be closed and locked. If that condition is not achieved, some problem must exist to prevent the gate from closing. In this condition, an alarm and visual messages are issued regardless of the spreading condition and velocity condition.

When the vehicle is stopped (not moving) a warning signal will be issued and the alarm will sound only if one or more of the sensors detects a problem.

Similarly, when the vehicle is travelling in the low range of speed or the high range of speed and is in the travelling mode, a warning signal will be issued and the alarm will sound if the gate locks are unlocked or the box is lifted or the gate is opened. Similarly, if the vehicle does not have a velocity sensor and the gate locks are unlocked or the box is raised or the gate is opened, an alarm will sound if the spreading mode cannot be used without an installed velocity sensor.

In the spreading mode, as long as no unsafe conditions are detected, no warning signal or alarm will be issued unless the vehicle exceeds the speed limit, the time limit or the distance limit for the spreading mode.

The present invention can be used on any dump body, for example, straight body dumps, dump trailers, dump semi-trailers, and dump trucks.

I claim:

1. A monitoring system for a vehicle having a dump body thereon, the system comprising at least four sensors mounted on the vehicle, the dump body having a discharge end, a first sensor located to monitor a position of the dump body between a maximum up position and a down position relative to the discharge end, the discharge end having a gate located therein, a second sensor located to monitor a position of the gate between a closed position and an open position, the gate having at least two gate locks, a third sensor located to monitor the gate locks between a locked position and an unlocked position, the vehicle having wheels thereon, and at least a fourth sensor located on one of the wheels of the vehicle, to monitor a speed and direction of the vehicle, all of the sensors arranged to provide an output signal to a display, the display controlled by a computer and software to provide a warning signal to an operator whenever any of the position of the dump body, the gate, locks, speed and/or direction are unsafe or breached, wherein when the warning signal is initiated, the warning signal continues until adjustments are made to one or more of the position of the dump body, gate, locks, speed and/or direction that results in the operation of the vehicle being in a safe mode, and wherein the display has a speaker and the warning signal is a visual symbol or symbols on the display and an audio alarm through the speaker, the warning signal occurring when the dump body is down, the gate is open and the gate lock is locked or when the dump body is up, the gate is closed, and the gate lock is locked or when the dump body is up, the gate is closed and the gate locks are unlocked, the warning signal is silent when the dump body is up, the gate is open and the gate locks are unlocked.

2. The monitoring system as claimed in claim 1, wherein when the speed is in a low range, and moving forward, the warning signal being produced when the dump body is tilted up, the gate is open and the gate locks are unlocked or the dump body is down, the gate is open and the gate locks are locked or the dump body is up, the gate is closed and the gate locks are locked, or the dump body is up, the gate is closed and the gate locks are unlocked.

3. The monitoring system as claimed in claim 2, wherein the speed is in a higher range of speed, the high range of speed being higher than the low range of speed, and moving forward, and the dump body is up, the gate is open and the gate locks are unlocked or the dump body is down, the gate is open and the gates are locked, or the dump body is up, the gate is closed, and the gate locks are locked or the dump body is up, the gate is closed and the gate locks are unlocked, or the dump body is down, the gate is closed and the gate locks are unlocked.

4. The monitoring system as claimed in claim 1, wherein the warning signal is inactive when the dump body is down, the gate is closed, and the gate locks are locked.

5. The monitoring system as claimed in claim 2 wherein the low range of speed is from approximately from one kilometer per hour to approximately twenty four kilometers per hour in a forward direction.

6. The monitoring system as claimed in claim 1, wherein the system has at least one of three modes, a dumping mode, a moving mode, and a spreading mode, and wherein, in the dumping mode, the dump body is up, the gate is open and the gate locks are unlocked, the direction is reverse or stopped and the speed is low range or stopped and there is no warning signal.

7. The monitoring system as claimed in claim 6, wherein, in the moving mode, and the low range of speed, the direction is forward or reverse, the dump body is down, the gate is closed, and the gate locks are locked or, in the high range of speed, the direction is forward and the dump body is down, the gate is closed, the gate lock is locked and there is no warning signal.

8. The monitoring system as claimed in claim 6, wherein, in the spreading mode, the direction is forward, the speed is in the low range, the dump body is up slightly, the gate is open and the gate locks are unlocked and there is no warning signal.

9. The monitoring system as claimed in claim 6, wherein the gate locks are considered by the system to be unlocked when at least one gate lock is unlocked or when at least one gate lock is not properly locking the gate.

10. The monitoring system as claimed in claim 6, wherein there are two gate locks, one lock being located on each side of the gate at or near a lower edge of the gate.

11. The monitoring system as claimed in claim 1, where any or all parameters of time, speed and distance are programmable and adjustable for each use of the system, a warning signal being issued whenever any of the parameters are breached.

12. A method of operating a monitoring system for a vehicle having a dump body thereon, the system comprising at least four sensors mounted on the vehicle, the dump body having a discharge end, a gate located in the discharge end to close off the discharge end when the gate is closed, and at least two gate locks, the vehicle having wheels, the method comprising installing a first sensor located to monitor a position of the dump body between a maximum up position and a down position relative to the discharge end, a second sensor located to monitor a position of the gate between a closed position and an open position, a third sensor located to monitor the gate locks between a locked position and an unlocked position, and at least a fourth sensor being located on one of the wheels to monitor a speed and direction of the vehicle, arranging all of the sensors to provide an output signal to a display and controlling the display by a computer and software to provide a warning signal to an operator whenever any position of the dump body, gate, locks, speed and/or direction is unsafe or breached, and further comprising in a moving mode, programming the computer to monitor the sensors and not to activate a warning signal when the vehicle is moving in a low range speed, the direction is forward or reverse, the dump body is down, the gate is closed and the gate locks are locked or, when the vehicle is moving in a high range of speed, the direction is forward and the dump body is down, the gate is closed and the gate lock is locked.

13. The method of claim 12, further comprising programming the computer to monitor the system and not to activate a warning signal with the vehicle is in a spreading mode, the direction is forward, the speed is in a low range, the dump body is up slightly, the gate is open and the gate locks are unlocked.

14. A monitoring system for a vehicle having a dump body thereon, the system comprising at least two sensors mounted on the vehicle, the dump body having a discharge end, a first sensor located to monitor a position of the dump body between a maximum up position and a down position relative to the discharge end, the discharge end having a gate located therein, and a second sensor located on one of the wheels of the vehicle, to monitor a speed and direction of the vehicle, all of the sensors arranged to provide an output signal to a display, the display controlled by a computer and software to provide a warning signal to an operator whenever any of the position of the dump body, speed and/or direction are unsafe or breached, wherein when the warning signal is initiated, the warning signal continues until adjustments are made to one or more of the position of the dump body, speed and/or direction that results in the operation of the vehicle being in a safe mode, and wherein the display has a speaker and the warning signal is a visual symbol or symbols on the display and an audio alarm through the speaker.

15. The monitoring system of claim 14, wherein the warning signal is a visual symbol or symbols on the display and an audio alarm, the warning signal occurring when the dump body is in an unsafe position.

\* \* \* \* \*